(12) United States Patent
Attavar et al.

(10) Patent No.: US 11,822,952 B2
(45) Date of Patent: Nov. 21, 2023

(54) MANAGING DOWNTIME TO NETWORKING MANAGERS DURING CONFIGURATION UPDATES IN CLOUD COMPUTING ENVIRONMENTS

(71) Applicant: VMware, Inc., Palo Alto, CA (US)

(72) Inventors: Tripti Dhananjaya Attavar, Sunnyvale, CA (US); Ankit Parmar, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 152 days.

(21) Appl. No.: 17/155,325

(22) Filed: Jan. 22, 2021

(65) Prior Publication Data
US 2022/0237013 A1    Jul. 28, 2022

(51) Int. Cl.
| | | |
|---|---|---|
| *G06F 9/455* | (2018.01) | |
| *G06F 9/54* | (2006.01) | |
| *G06F 8/65* | (2018.01) | |
| *G06F 9/50* | (2006.01) | |

(52) U.S. Cl.
CPC ............ *G06F 9/45558* (2013.01); *G06F 8/65* (2013.01); *G06F 9/5077* (2013.01); *G06F 9/542* (2013.01); *G06F 9/5016* (2013.01); *G06F 9/5022* (2013.01); *G06F 9/5027* (2013.01); *G06F 2009/45591* (2013.01); *G06F 2009/45595* (2013.01)

(58) Field of Classification Search
CPC ...... G06F 9/45558; G06F 8/65; G06F 9/5077; G06F 9/542; G06F 2009/45591; G06F 2009/45595; G06F 9/5016; G06F 9/5022; G06F 9/5027
See application file for complete search history.

(56) References Cited

U.S. PATENT DOCUMENTS

| | | | |
|---|---|---|---|
| 9,110,693 B1* | 8/2015 | Meiri | G06F 9/4856 |
| 9,672,054 B1* | 6/2017 | Gupta | G06F 9/5083 |
| 10,404,579 B1* | 9/2019 | Biemueller | H04L 41/0803 |
| 2009/0113031 A1* | 4/2009 | Ruan | H04L 67/56 709/223 |
| 2014/0068600 A1* | 3/2014 | Ashok | G06F 9/5077 718/1 |
| 2020/0382405 A1* | 12/2020 | Banerjee | H04L 49/70 |
| 2020/0412622 A1* | 12/2020 | Sherwood | H04L 43/08 |
| 2022/0229689 A1* | 7/2022 | Ota | G06F 9/50 |

* cited by examiner

*Primary Examiner* — Michael W Ayers (57) ABSTRACT

Described herein are systems and methods that manage configuration updates for networking manager virtual machines. In one example, a method includes identifying an update for at least one networking manager virtual machine. In response to identifying the update, the method notifies a daemon on the host with the networking manager virtual machine to establish a channel with a control plane agent to receive communications in place of the networking manager virtual machine. The method further identifies when the configuration modification is complete for the networking manager virtual machine and notifies the daemon on the host to break the channel with the control plane agent.

20 Claims, 6 Drawing Sheets

MANAGING DOWNTIME TO NETWORKING MANAGERS DURING CONFIGURATION UPDATES IN CLOUD COMPUTING ENVIRONMENTS

BACKGROUND

Cloud computing environments use host computing systems to provide a platform for virtual machines that can provide various workload operations for one or more tenants. To connect the virtual machines to each other and to one or more outside networks, logical and physical networking elements may be used to provide switching, routing, firewall, and other similar tasks. In some implementations, to configure the logical networking elements, a networking manager may be implemented that permits a user associated with a tenant of the cloud computing environment to create, configure, and monitor components such as controllers, logical switches, and edge services gateways. When a configuration update is applied by the user via the networking manager, the manager may communicate with one or more controllers to trigger the required updates.

In some implementations, configuration modifications to a tenant's virtual machines may require the restart of one or more networking managers associated with the tenant, wherein the networking managers may each reside in a virtual machine. For example, a tenant may request that the virtual machines are allocated additional processing and memory resources, which requires a restart of the virtual machines that belong to the tenant. However, issues can arise when the one or more managers are unavailable to the controllers. In particular, if a controller attempts to communicate with the networking manager when the networking manager is down, an error can prevent the proper operation of the network until the issue is manually resolved by a user.

OVERVIEW

The technology disclosed herein manages the configuration updates for networking manager virtual machines. In one implementation, a method includes identifying a request to modify a configuration of a networking manager virtual machine on a host and, in response to the request notifying a daemon on the host to establish a channel to receive communications in place of the networking manager virtual machine. The method further includes identifying an indication that the modification to the configuration for the networking manager virtual machine is complete and, in response to the indication, in response to the indication, notifying the daemon on the host to break the channel with control plane agent.

DETAILED DESCRIPTION

Figure 1:
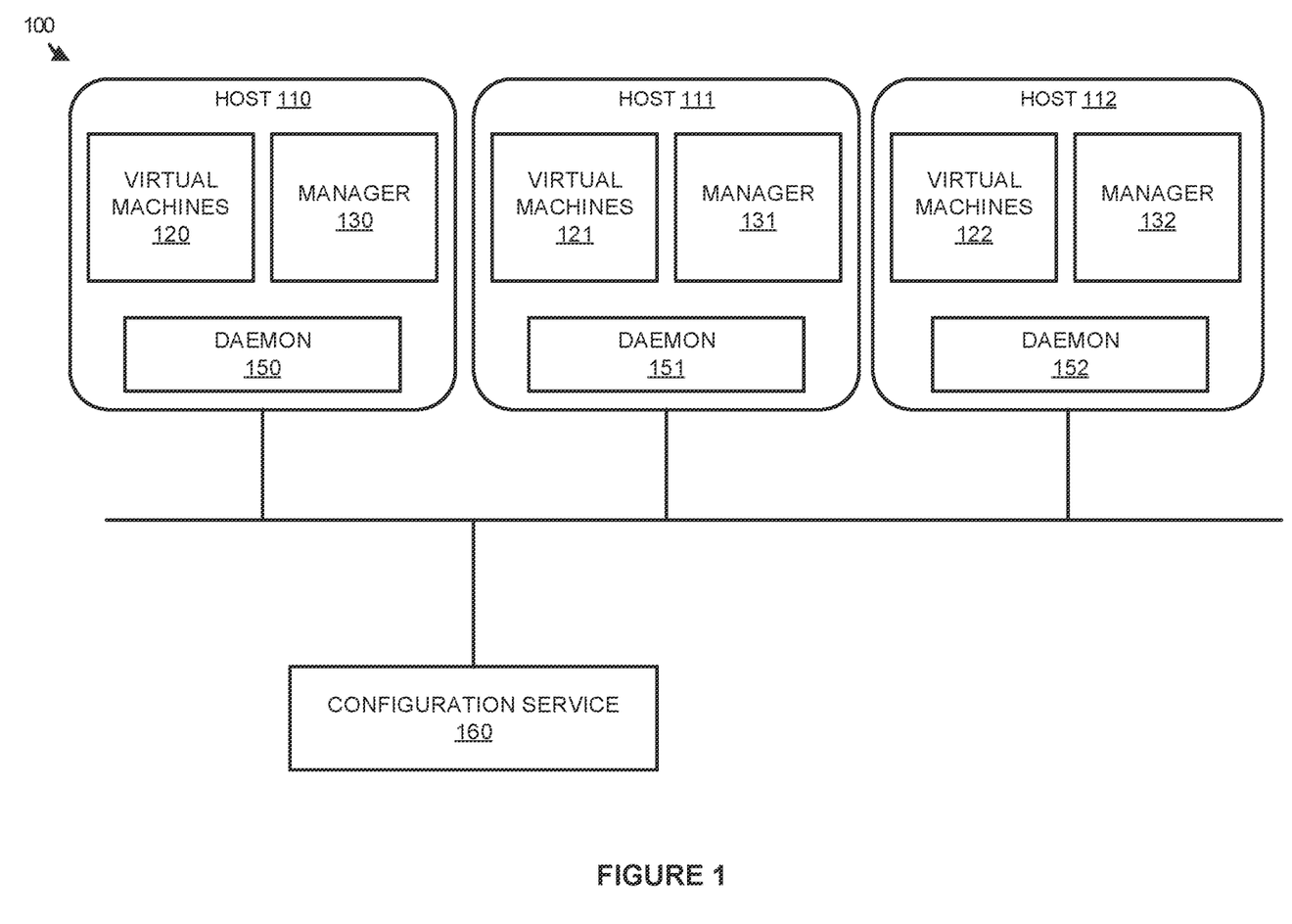
FIG. 1 illustrates a computing environment to manage resource configuration changes to networking managers according to an implementation.

FIG. 1 illustrates a computing environment 100 to manage resource configuration changes to networking managers according to an implementation. Computing environment 100 includes hosts 110-112 and configuration service 160 that are coupled via a network. Hosts 110-112 further include virtual machines 120-122, networking managers 130-132, and daemons 150-152. Managers 130-132 are representative of virtual machines that can be used to create, configure, and monitor components, such as controllers and logical switches for a tenant of computing environment 100. Daemons 150-152 are representative of local instances of a service that can provide a Software Defined-Data Center for a tenant, wherein the service may be used to allocate resources and other quality of service information to the virtual machines for the tenant. Although demonstrated in the example of computing environment 100 as including three hosts, it should be understood that computing environment 100 may include any number of hosts and may further include any number of networking managers. Although demonstrated as separate, it should be understood that configuration service 160 may execute across one or more computing systems or may execute at least partially on hosts 110-112.

In operation, virtual machines 120-122 are deployed in computing environment 100 to provide one or more operations for a tenant of computing environment 100. The operations of virtual machines 120-122 may include front-end operations, data processing operations, database operations, or some other operation for the tenant. To provide connectivity for the various virtual machines, physical and logical networking may be employed that can use one or more controllers to configure logical routers, switches, firewalls, and the like. In configuring the controllers, networking managers 130-132 are included that can provide a graphical user interface for a tenant of computing environment 100 to create, configure, and monitor components of the network for the virtual machines. For example, a networking manager of networking managers 130-132 may provide an update to one or more controllers on the hosts to deploy a new firewall rule.

In some implementations, configuration service 160 may be used to update the resource allocation to virtual machines 120-122 and managers 130-132. The resource allocation may include processing resources, memory resources, or some other resource. For example, when virtual machines 120-122 and managers 130-132 are first initiated, the virtual machines may be allocated a first set of resources. However, the tenant may request to increase or decrease the resources available to each of the virtual machines. In response to the request, configuration service 160 may initiate a process to stop the executing virtual machines, modify the configuration of the virtual machines, and restart the virtual machines.

Here, when a modification request is identified by configuration service 160, a notification is provided to a manager of managers 130-132, such as manager 130. In response to being notified, manager 130 may communicate with daemon 150, wherein daemon 150 may represent a locally executing process for configuration service 160. In some implementations, configuration service 160 may be used to manage patch management, upgrades, maintenance, and other similar operations with respect to the virtual machines and logical networking for a tenant. In communicating with the daemon, manager 130 may instruct the daemon to establish a connection with a control plane agent, wherein the connection may be used by daemon 150 to act as a proxy for manager 130 during the downtime for manager 130. In particular, the control plane agent may, during normal operation, communicate with manager 130 to provide status information in association with the configuration implemented via the control plane. When the connection is established between daemon 150 and the control plane agent, communications from the control plane agent may be provided to daemon 150 in place of manager 130. Once daemon 150 is invoked as a proxy for manager 130, configuration service 160 may power down manager 130 and initiate the update to the configuration. The process may be repeated for the remaining managers in computing environment 100 that require a configuration modification. In some implementations, each manager may be updated in serial, such that each manager is updated separately.

Once the managers are updated and configuration service 160 determines that the environment is stable, configuration service 160 may initiate a process to terminate the connections between the daemons 150-152 and the corresponding control plane agent on each host of hosts 110-112. Managers 130-132 may further reestablish the connection with the control plane agents and resume the communications of control plane status information. The stability of the environment may include determining when virtual machines are restarted, coupled to a logical port for the network, or some other availability factor. In some examples, the daemons may further provide updates to the managers when the managers reestablish the connection with the control plane agent. The updates may include status information, such as migration information (host identifier, network addressing, and the like) obtained from the control plane agent during the downtime of the manager.

Figure 2:
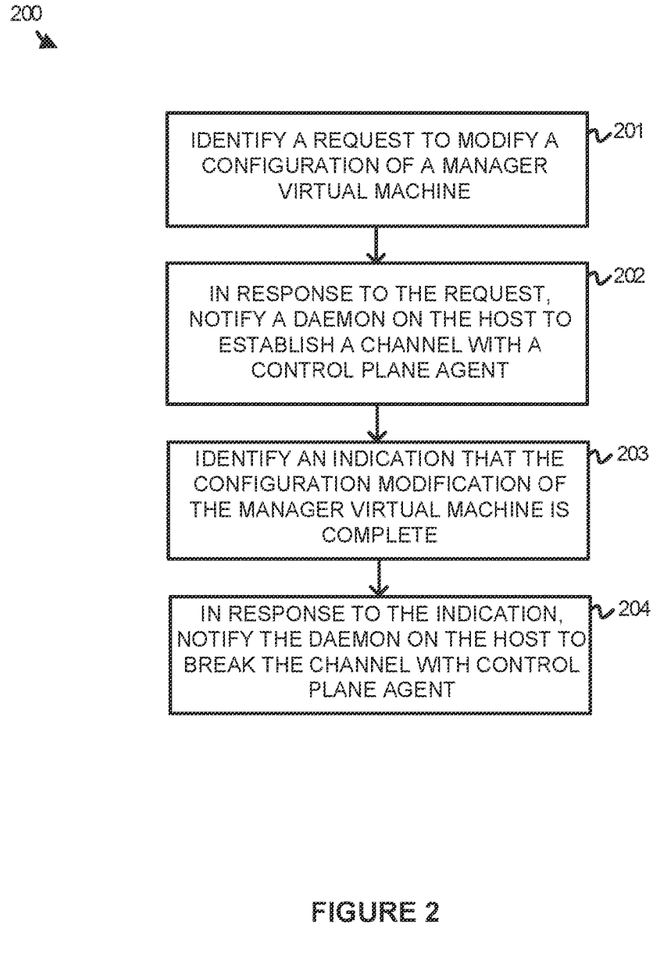
FIG. 2 illustrates an operation to manage downtime for a networking manager during resource configuration changes according to an implementation.

FIG. 2 illustrates an operation 200 to manage downtime for a networking manager during resource configuration changes according to an implementation. The steps of operation 200 are referenced parenthetically in the paragraphs that follow.

Operation 200 include identifying (201) a request to modify a configuration of a networking manager virtual machine on a host. In some implementations, a user associated with computing environment 100 may use configuration service 160 to change resource allocation to the virtual machines and manager virtual machines in computing environment 100. The resource allocation modification may include adding or reducing processing resources, such as processing cores, memory, or some other modification to the virtual machines. In response to the request, operation 200 further notifies (202) a daemon on the host to establish a channel with a control plane agent to receive communications in place of the networking manager virtual machine.

In some examples, configuration service 160 may provide a request to a manager, such as manager 130, indicating a modification is required to the configuration of manager 130. Once the request is identified by manager 130, manager 130 may notify a daemon on the host to establish a connection with a control plane agent. This daemon may be used to represent the networking manager during the downtime of the networking manager. In particular, the control plane agent may communicate with manager 130 to provide and obtain status information associated with the control and the one or more controllers for the network. To maintain the connection for the control plane agent, the daemon, which may act as a local operation for configuration service 160 acts as the manager for communications from the control plane agent. In some examples, the connection may comprise a transmission control protocol (TCP) connection initiated by the daemon. Once the connection is established between daemon 150 and the control plane agent, configuration service 160 may stop the execution of manager 130 and update the configuration prior to restarting manager 130.

After establishing the connection between daemon 150 and the control plane agent, operation 200 further identifies (203) an indication that the modification to the configuration for the networking manager virtual machine is complete. In some examples, configuration service 160 may monitor for when each manager of managers 130-132 is restarted with the new configuration. Once identified, configuration service 160 may notify (204) the daemon to terminate or break the communication channel with the control plane agent. In some implementations, the notification may include communicating a notification to manager 130 indicating the completion of the modification to the computing environment, and manager 130 may provide a subsequent notification to the daemon, directing the daemon to break the connection. The notification from configuration service 160 may further direct manager 130 to reestablish the connection with the control plane agent.

In some implementations, when the daemon is maintaining the connection with the control plane agent, the daemon may monitor the information provided by the agent, including any movement of virtual machines in computing environment 100. For example, due to the configuration modification, one or more virtual machines may be migrated from a first host to a second host. As the information is maintained by the daemon, the daemon may provide any of the required migration information to the restarted networking manger virtual machine. The information may include host identifier, addressing associated with the virtual machines, or some other information.

Figure 3:
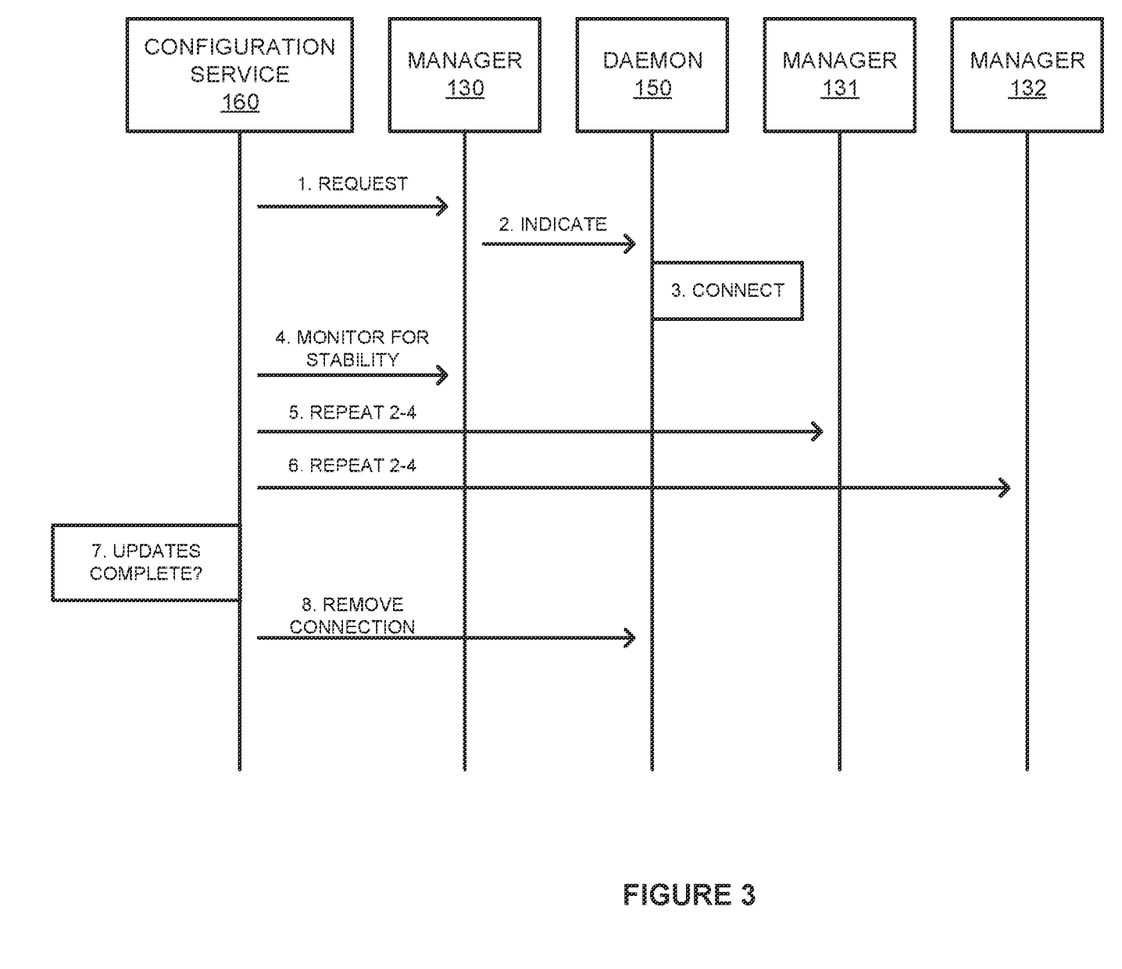
FIG. 3 illustrates a timing diagram to update a resource configuration for networking manager virtual machines according to an implementation.

FIG. 3 illustrates a timing diagram 300 to update a resource configuration for networking manager virtual machines according to an implementation. Timing diagram 300 includes configuration service 160, managers 130-132, and daemon 150 from computing environment 100 of FIG. 1. The remaining elements of computing environment 100 have been omitted for clarity.

In operation, configuration service 160 identifies a request to update a configuration associated with the virtual machines in the computing environment. In some implementations, the request may be initiated by a user or administrator associated with an owner or tenant of the virtual machines. The configuration modification may be used to increase processing resources, memory resources, or some other modification that requires a restart of the virtual machines. Once a request is identified by configuration service 160, configuration service 160 may communicate, at step 1, the request to manager 130, indicating that manager 130 is to be shut down to implement the new configuration. Manager 130, in turn, provides a notification, at step 2, to daemon 150 that indicates the requirement for manager 130 to be restarted.

In response to receiving the notification, daemon 150 establishes a connection or channel, at step 3, with a control plane agent to receive communications in place of manager 130. In some implementations, when manager 130 is available, manager 130 may connect with the control plane agent to exchange status information associated with the control plane. The status information may be used to identify where virtual machines are executing in the computing environment, availability information associated with the virtual machines or logical connections of the virtual machines, or some other status information. Daemon 150 may represent a locally executing process that operates as part of the configuration service. However, it should be understood that daemon 150 may represent any process that can act in place of the manager virtual machine during a down period for the manager virtual machine. The control plane agent, which may also comprise a daemon or process, may execute on the same host to communicate the control plane status information to the manager virtual machine.

Once the channel is established between the daemon and the control plane agent, configuration service 160 may initiate, at step 4, the update of manager 130 and monitor the manager for stability or completion of the update. Once manager 130 is updated, steps 2-4 may be repeated for manager 131, at step 5, and for manager 132, at step 6. In some implementations, when a tenant deploys a cloud computing environment, multiple instances of the manager are deployed to provide redundancy and failover operations. Accordingly, each of the managers may be updated with a modified configuration in serial to maintain availability of a manager.

After triggering the updates to managers 130-132, configuration service may monitor and determine when the updates are complete at step 7. This determination may be based on stability of each of the managers, notifications from each of the managers indicating the managers are available, or some other information indicating the completion of the configuration modification. In response to the completion, configuration service 160 may initiate a removal or termination of the connection between daemon 150 and the control plane agent. Similarly, configuration service 160 may initiate the removal or termination of the connections for daemons and control agents associated with managers 131-132. Further, configuration service 160 may permit each of the managers to reestablish a connection with the respective control plane agent to resume network management operations for the computing environment. In some implementations, the termination of the connections for the daemons may occur when all of the managers have completed the update. In other implementations, when a first manager completes an update, configurations service 160 may terminate the connection between the daemon and the control plane agent and permit the first manager to resume operations. Once the first manager resumes operations, a second manager may be updated and, once stable, may be permitted to replace the daemon with the manager in communicating with the associated control plane agent.

Figure 4:
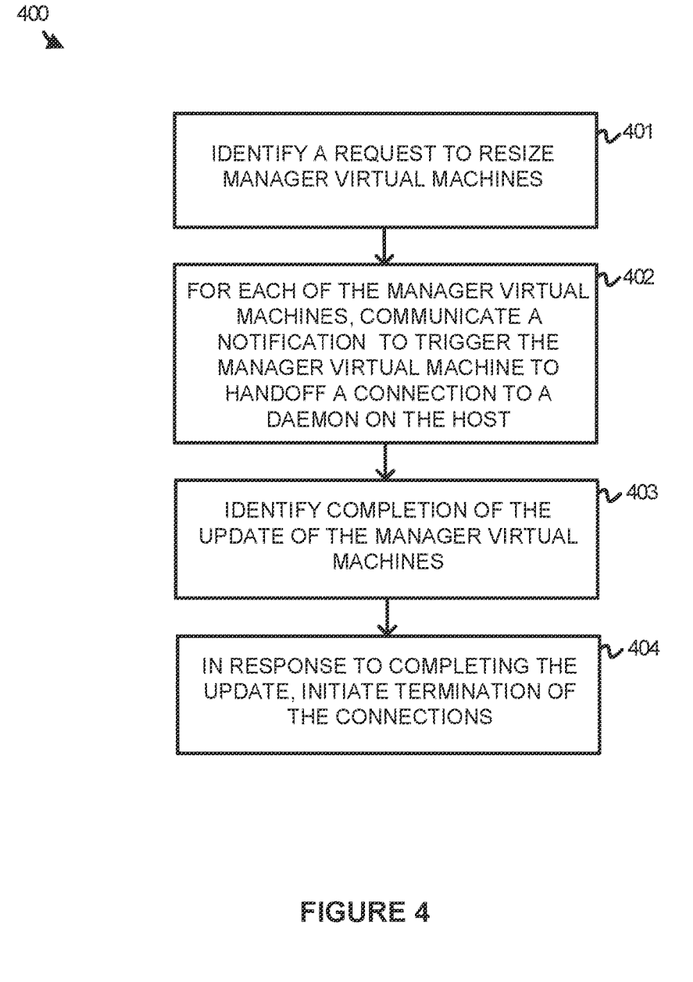
FIG. 4 illustrates an operation to manage downtime for networking manager virtual machines according to an implementation.

FIG. 4 illustrates an operation 400 to manage downtime for networking manager virtual machines according to an implementation. The steps of operation 400 are referenced parenthetically in the paragraphs that follow.

As depicted, operation 400 includes identifying (401) a request to change a resource allocation to networking manager virtual machines. In some implementations, a configuration service may permit a user or administrator associated with a cloud computing environment to modify the computing resources allocated to workload virtual machines and support virtual machines, such as networking manager virtual machines. The modification may be used to increase processing or memory resources, decrease processing or memory resources, or provide some other modification. In response to identifying the request and for each networking manager virtual machine in the computing environment, operation 400 communicates (402) a notification to trigger the networking manager virtual machine to handoff a connection to a daemon executing on the host. In particular, a configuration service may notify the manager that a configuration modification requires a down period for the networking manager. In response to receiving the notification, the manager may notify a daemon on the same host of the update and direct the daemon to establish a connection with a control plane agent, wherein the connection may permit the daemon to receive communications in place of the networking manager virtual machine. These communications may include status information and other checks communicated from the control plane (one or more controllers) to the networking manager virtual machine Once channel is established using the daemon, the manager virtual machine may be powered off and updated with the requested resources. As the managers are updated, operation 400 further identifies (403) a completion of the update to the networking manager virtual machines. In some implementations, a configuration service for the computing environment may determine when the virtual machines in the computing environment are stable (e.g., executing and reporting to the configuration service). Once the update is identified as complete, operation 400, initiates (404) termination of the connections from the daemons to the control plane agents. In some implementations, the termination of the connections may occur when all of the networking manger virtual machines have a completed update and are stable. In other implementations, each daemon to control plane agent connection may be terminated when the corresponding networking manager virtual machine is updated.

As the connections are terminated between the daemons and the control plane agents, the networking manager virtual machines may reestablish connections with the corresponding control plane agent. Advantageously, the daemon may maintain the required connection with the control plane agent and receive status information from the control plane agent while the manager virtual machine is unavailable. Once the networking manager virtual machine reestablishes the connection, the daemon may provide any required status information to the manager virtual machine, such as the movement of virtual machines in the computing environment that may have occurred when the networking manager virtual machine was unavailable.

Figure 5:
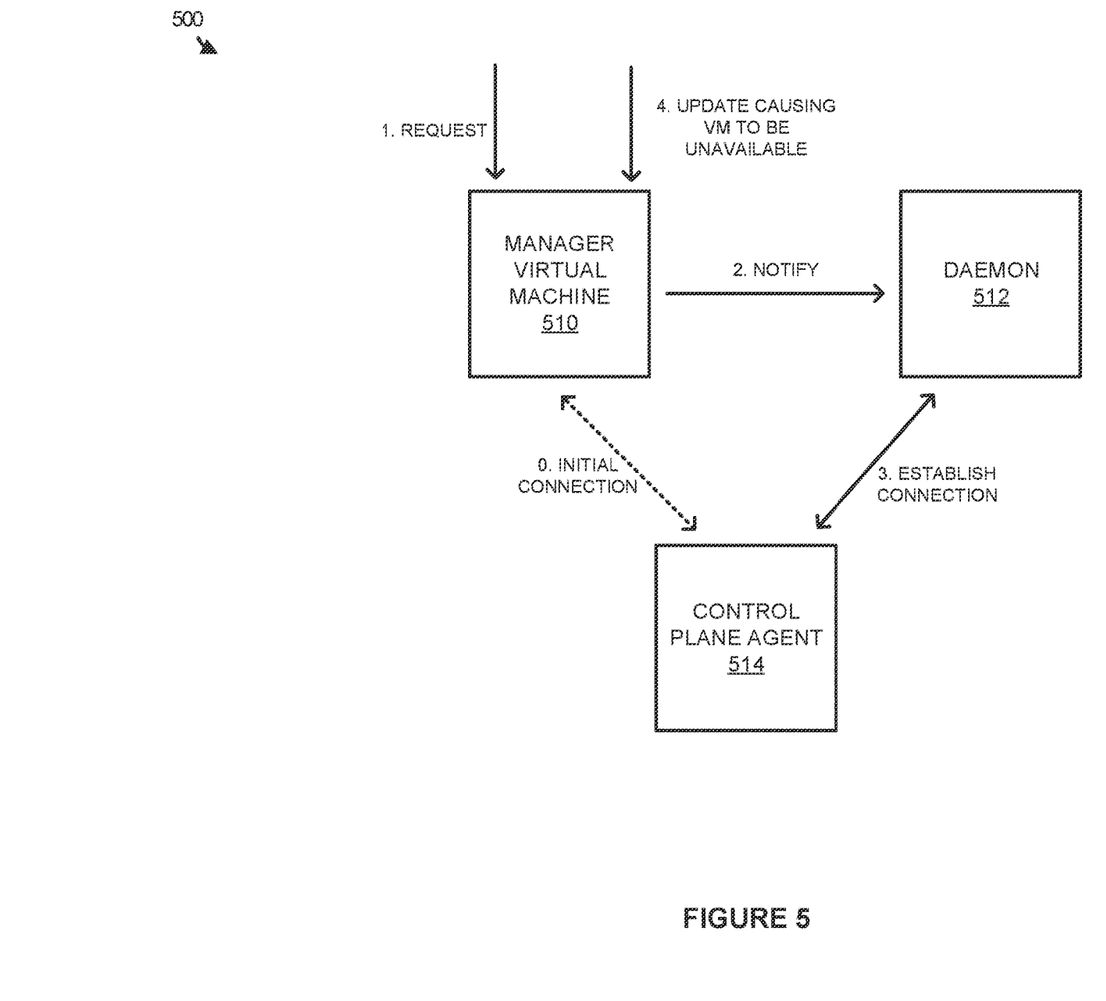
FIG. 5 illustrates an operational scenario of updating a configuration of a networking manager virtual machine according to an implementation.

FIG. 5 illustrates an operational scenario 500 of updating a configuration of a networking manager virtual machine according to an implementation. Operation scenario 500 includes manager virtual machine 510, daemon 512, and control plane agent 514. Virtual machine 510, daemon 512, and control plane agent 514 may all execute on the same host computing system in some examples.

As depicted, manager virtual machine 510 maintains an initial connection, at step 0, with control plane agent 514. This connection, which may comprise a TCP connection in some examples, may be used to communicate between the management plane and the control plane of the computing environment. In particular, the management plane, provided at least in part by manager virtual machine 510, may be used by an administrator to create, configure, and monitor components such as controller, logical switches and edge services gateways. Once an update is identified for the networking for the computing environment, the networking manager may communicate with the control plane to implement the modification, wherein the modification may be deployed across one or more controllers on the hosts for the computing environment.

In some implementations, a configuration service may be used to update the configuration associated with the virtual machines in a computing environment. For example, a tenant of a cloud service provider may generate a request to update the resources allocated to virtual machines, wherein the resources may include processing resources, memory resources, storage resources, or some other resource. This update in resource allocation may require both workload virtual machines and networking management virtual machines to by stopped and restarted to include the new resources. Here, when an update is requested, the configuration service may provide a request to manager virtual machine 510, at step 1. In response to the request, manager virtual machine 510 may notify, at step 2, daemon 512 executing on the same host to maintain connections for manager virtual machine 510 during the downtime for manager virtual machine 510. In some implementations, manager virtual machine 510 may include communication information, such as connection information to maintain the connection for manager virtual machine 510.

In response to receiving the notification, daemon 512 may establish a connection, such as a TCP connection, with control plane agent 514 to receive communications from the control plane agent in place of manager virtual machine 510. Once the new connection is established between the daemon on the host and the control plane agent, the update can be initiated, at step 4, for manager virtual machine 510. In some implementations, the update may include powering off manager virtual machine 510, changing the resources allocated to the virtual machine, and restarting the virtual machine with the new resources.

In some implementations, the configuration service that initiates the configuration changes to the virtual machines may monitor the virtual machines to determine when the restarted virtual machines are stable or available for workload or other processes. When manager virtual machine 510 is restarted and stable with the configuration change, the configuration service may update daemon 512 and manager virtual machine 510. In some implementations, manager virtual machine 510 may communicate a request to daemon 512 requesting daemon 512 to terminate the connection with control plane agent 514. In addition to terminating the connection between daemon 512 and control plane agent 514, manager virtual machine 510 may reestablish a connection with control plane agent 514. In reestablishing the connection, control plane agent 514 may resume providing status information and checks to manager virtual machine 510. In some examples, daemon 512 may obtain information about the migration of virtual machines in the computing environment from control plane agent 514. When manager virtual machine 510 is stable, daemon 512 may provide or update manager virtual machine 510 with information about the migration of the virtual machines, including hosts for the virtual machines, port status information for the virtual machines, or some other information about the migration of the virtual machines.

In some implementations, a computing environment may employ multiple networking manager virtual machines, wherein the multiple virtual machines may provide failovers for the networking management of the computing environment. When a configuration update is identified for the computing environment to modify resource allocation to the virtual machines that belong to the client, the configuration service may update each of the networking manager virtual machines. In some examples, the updates may occur in serial, wherein the configuration service may, for each of the networking managers, communicate a request to handoff communications from the networking manager to a corresponding daemon on the host. Once the communications are passed off to the daemon, the networking manager may be updated via a restart, and the status of the networking manager may be monitored to determine when the manager is stable. Once stable, each of the networking manager virtual machines may reestablish the connection with the control plane agent or may reestablish the connection with the control plane agent when all of the networking manager virtual machines are stable.

Figure 6:
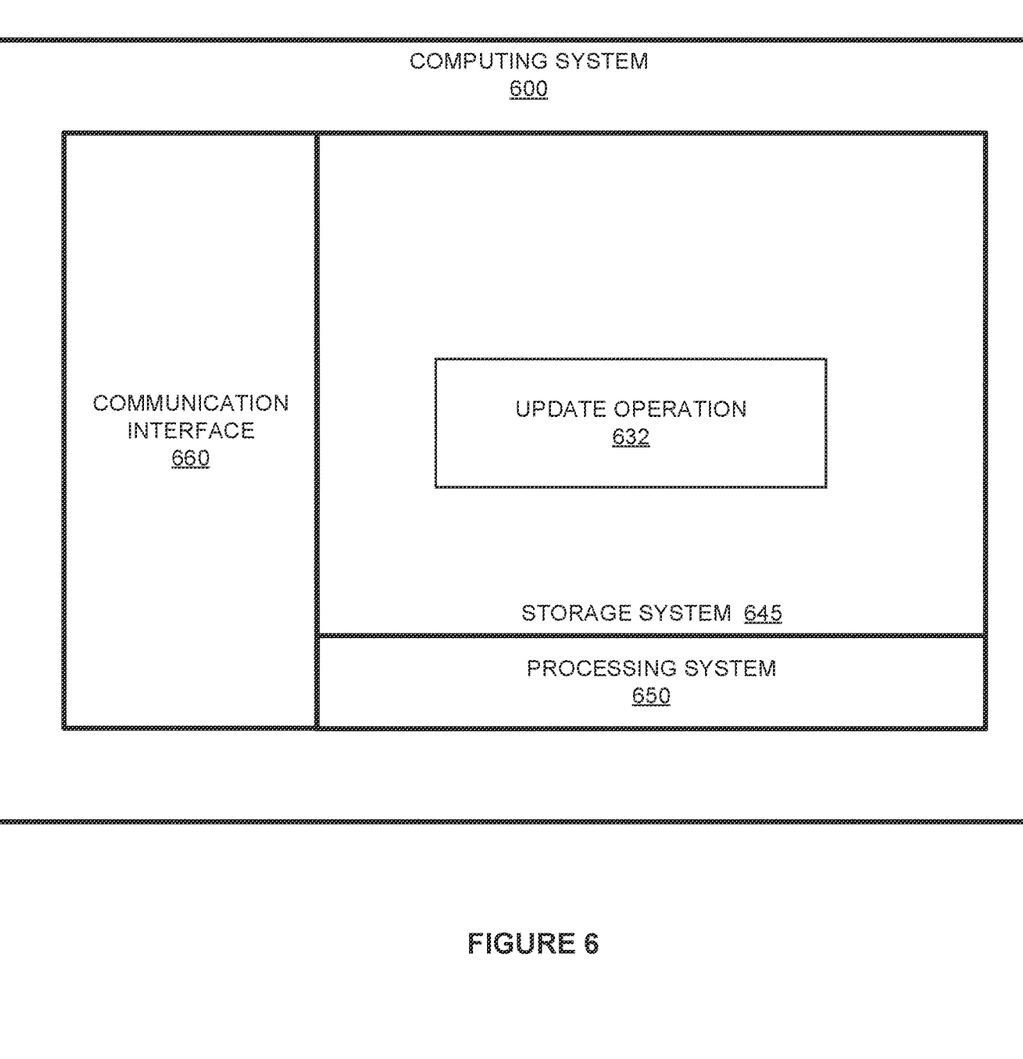
FIG. 6 illustrates a computing system to manage downtime for networking manager virtual machines according to an implementation.

FIG. 6 illustrates a computing system 600 to manage downtime for networking manager virtual machines according to an implementation. Computing system 600 is representative of any computing system or systems with which the various operational architectures, processes, scenarios, and sequences disclosed herein for updating a networking manager virtual machine can be implemented. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 is an example of a physical network interface that can be configured to communicate with other computing systems to provide required operations for the processes executing on computing system 600. Communication interface 660 may communicate with one or more host computing systems in a cloud computing environment in some examples.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises update operation 632. The operating software on storage system 645 may further include utilities, drivers, network interfaces, applications, or some other type of software. When read and executed by processing system 650 the operating software on storage system 645 directs computing system 600 to operate as described herein. In some examples, the operating software provides at least operations 200 and 400 of FIGS. 2 and 4, respectively.

In at least one implementation, update operation 632 directs processing system 650 to identify a request to modify a configuration of a networking manager virtual machine on a host. The configuration modification may comprise any modification that requires downtime for the networking manager virtual machine. In some examples, the configuration modification may comprise resource allocation modifications, wherein the configuration modification may be used to increase or decrease processing resources, memory resources, storage resources, and the like. In response to the request, which may initially be identified by a configuration service, a notification is provided to one or more networking managers, indicating the request to update. In response to the request, each of the networking manger virtual machines may provide a notification to a daemon or process executing on the host. In particular, the notification may be used to notify the daemon on the host to establish a channel with a control plane agent to receive communications in place of the networking manager virtual machine. Advantageously, during downtime for the virtual machine, the daemon may communicate status information in place of the networking manager virtual machine. The status information may include the status of virtual machines in the computing environment, the location of the virtual machines in the computing environment, or some other information associated with the status of the virtual machines.

In some implementations, update operation 632 may direct processing system 650 to monitor for when each of the networking manager virtual machines and restore the connections to the one or more control plane agents for the networking manager virtual machines. In some examples, the updates to the networking manager virtual machines may be initiated in serial. These updates may identify a first networking manager virtual machine and initiate a handoff of the connections from the networking manager virtual machine to the daemon executing on the host. Once the communications are directed to the daemon in place of the networking manager virtual machine, the virtual machine may be stopped, and the configuration changed. Once the configuration is changed and the restarted virtual machine is stable, the connection may transition back from the daemon to the networking manager virtual machine. In some examples, the networking manager virtual machine may reestablish the connection when the networking manager is stable. In other examples, the networking manager virtual machine may reestablish the connection when each of the networking manager virtual machines are stable.

For example, a computing environment may use three networking manager virtual machines, which are each required to be updated as part of a configuration update for the computing environment. Update operation 632 may, for each of the networking manager virtual machines, notify the networking manager virtual machine to handoff a connection to a daemon executing on the host, such that the daemon may receive communications from a control plane agent in place of the manager. Update operation 632 may further direct processing system 650 to monitor for when all of the networking virtual machines are stable using the updated configuration and initiate an operation to make the networking managers active in association with the control plane agents. This may include directing the agents to terminate the connection with the control plane agent and permitting the networking managers to resume connections with the control plane agents. In some implementations, the daemons may further provide update information to the managers, indicating status information that was missed during the downtime to the managers. The status information may include at least migration information associated with any movement of virtual machines in the computing environment during the downtime.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
    identifying a request to modify a configuration of a networking manager virtual machine on a host;
    in response to the request, triggering a daemon on the host to establish a channel with a control plane agent executing on the host to receive communications in place of the networking manager virtual machine;
    identifying an indication that the modification to the configuration for the networking manager virtual machine on the host is complete; and
    in response to the indication, triggering the daemon on the host to break the channel with control plane agent.

2. The method of claim 1, wherein the request to modify the configuration of the networking manager virtual machine comprises a request to increase processing resources and/or memory resources for the networking manager virtual machine.

3. The method of claim 1, wherein the processing resources comprise processing cores.

4. The method of claim 1, wherein the request to modify the configuration of the networking manager virtual machine comprises a request to decrease the processing resources and/or memory resources for the networking manager virtual machine.

5. The method of claim 1 further comprising initiating a modification to the configuration of the networking manager virtual machine.

6. The method of claim 5, wherein initiating the modification to the configuration comprises shutting down the networking manager virtual machine.

7. The method of claim 1, wherein the request further indicates a modification to one or more configurations associated with one or more additional networking manager virtual machines, and the method further comprising:
    in response to the request and for each of the one or more additional networking manager virtual machines:
        notifying a daemon on a second host for the additional networking manager virtual machine to establish a channel with a control plane agent on the second host to receive communications in place of the additional networking manager virtual machine;
        identifying an indication that the modification to the additional networking manager virtual machine is complete; and in response to the indication that the modification to the additional networking manager virtual machine is complete, notifying the daemon on the second host to break the channel with the control plane agent on the second host.

8. The method of claim 7 further comprising initiating the modifications to the networking manager virtual machine and the one or more additional networking manager virtual machines.

9. The method of claim 1 further comprising, in the daemon, establishing the channel with the control plane agent.

10. A computing apparatus comprising:
a storage system;
a processing system operatively coupled to the storage system; and
program instructions stored on the storage system that, when executed by the processing system, direct the computing apparatus to:
identify a request to modify a configuration of a networking manager virtual machine on a host;
in response to the request, trigger a daemon on the host to establish a channel with a control plane agent executing on the host to receive communications in place of the networking manager virtual machine;
identify an indication that the modification to the configuration for the networking manager virtual machine on the host is complete; and
in response to the indication, trigger the daemon on the host to break the channel with control plane.

11. The computing apparatus of claim 10, wherein the request to modify the configuration of the networking manager virtual machine comprises a request to increase processing resources and/or memory resources for the networking manager virtual machine.

12. The computing apparatus of claim 11, wherein the processing resources comprise processing cores.

13. The computing apparatus of claim 10, wherein the request to modify the configuration of the networking manager virtual machine comprises a request to decrease the processing resources and/or memory resources for the networking manager virtual machine.

14. The computing apparatus of claim 10, wherein the program instructions further direct the computing apparatus to initiate a modification to the configuration of the networking manager virtual machine.

15. The computing apparatus of claim 14, wherein initiating the modification to the configuration comprises shutting down the networking manager virtual machine.

16. The computing apparatus of claim 10, wherein the request further indicates a modification to one or more configurations associated with one or more additional networking manager virtual machines, and wherein the program instructions further direct the computing apparatus to:
in response to the request and for each of the one or more additional networking manager virtual machines:
notify a daemon on a second host for the additional networking manager virtual machine to establish a channel with a control plane agent on the second host to receive communications in place of the additional networking manager virtual machine;
identify an indication that the modification to the additional networking manager virtual machine is complete; and
in response to the indication that the modification to the additional networking manager virtual machine is complete, notify the daemon on the second host to break the channel with the control plane agent on the second host.

17. The computing apparatus of claim 16, wherein the program instructions further direct the computing apparatus to the modifications to the networking manager virtual machine and the one or more additional networking manager virtual machines.

18. The computing apparatus of claim 10, wherein the program instructions further direct the computing apparatus to, in the daemon, establish the channel with the control plane agent.

19. A method comprising:
identifying a request to modify configurations of networking manager virtual machines;
for each networking manager virtual machine of the networking manager virtual machines:
triggering a daemon on a host for the networking manager virtual machine to establish a channel with a control plane agent executing on the host to receive communications in place of the networking manager virtual machine;
identifying an indication that the modification to the configuration for the networking manager virtual machine on the host is complete; and
in response to the indication, triggering the daemon on the host to break the channel with the control plane agent.

20. The method of claim 19, wherein the request to modify the configuration of the networking manager virtual machine comprises a request to increase processing resources and/or memory resources for the networking manager virtual machine.

* * * * *